(12) United States Patent
Pasha et al.

(10) Patent No.: US 10,936,640 B2
(45) Date of Patent: Mar. 2, 2021

(54) INTELLIGENT VISUALIZATION OF UNSTRUCTURED DATA IN COLUMN-ORIENTED DATA TABLES

(71) Applicant: International Business Machines Corporation, Armonk, NY (US)

(72) Inventors: Matheen A. Pasha, Bangalore (IN); Soma Shekar Naganna, Bangalore (IN); Abhishek Seth, Bangalore (IN); Subramanian Palaniappan, Bangalore (IN); Pushpalatha M. Hiremath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/155,247

(22) Filed: Oct. 9, 2018

(65) Prior Publication Data

US 2020/0110838 A1    Apr. 9, 2020

(51) Int. Cl.
*G06F 16/00* (2019.01)
*G06F 16/34* (2019.01)
*G06N 7/00* (2006.01)

(52) U.S. Cl.
CPC .......... *G06F 16/34* (2019.01); *G06N 7/005* (2013.01)

(58) Field of Classification Search
CPC .... G06F 16/34; G06F 16/252; G06F 16/2465; G06F 17/30303; G06F 17/30716; G06F 16/9535; G06F 16/24578; G06F 17/3053; G06F 17/30867; G06F 16/24568; G06F 16/2477; G06F 16/2322; G06F 16/128; G06F 16/00; G06F 17/00; G06F 17/30; G06F 9/546; G06F 11/14; G06F 11/16; G06F 16/258; G06F 11/1471; G06F 17/30864; G06Q 50/01; H04L 63/0884; H04L 63/302; H04L 67/306; H04L 63/308
See application file for complete search history.

(56) References Cited

U.S. PATENT DOCUMENTS

2003/0149934 A1* 8/2003 Worden ................ G06F 16/84
715/239
2005/0120029 A1* 6/2005 Tomic .................... G06F 16/86
(Continued)

*Primary Examiner* — Anh Ly
(74) *Attorney, Agent, or Firm* — Schmeiser, Olsen & Watts, LLP; William Hartwell

(57) ABSTRACT

A system and method for intelligent visualization of unstructured data in a column-oriented data table includes receiving unstructured data from a plurality of sources for recording into the column-oriented data table having a database schema using a plurality of keys to visualize one or more attributes in the column-oriented data table, determining that a semantically related key is used to visualize the one or more attributes contained in the unstructured data received from the plurality of sources, wherein the semantically related key is different from the plurality of keys and is not synchronized with the database schema of the column-oriented data table, formatting the unstructured data to synchronize the unstructured data with the database schema of the column-oriented data table, and outputting the synchronized unstructured data into the column-oriented data table so that the unstructured data is visualized according to the database schema of the column-oriented data table.

20 Claims, 9 Drawing Sheets

(56) References Cited

U.S. PATENT DOCUMENTS

| | | | |
|---|---|---|---|
| 2007/0011134 A1* | 1/2007 | Langseth | G06F 16/254 |
| 2007/0016610 A1* | 1/2007 | Cohen | G16H 30/20 |
| 2007/0088707 A1* | 4/2007 | Durgin | G06F 16/275 |
| 2007/0100858 A1* | 5/2007 | Milstead | G06F 40/186 |
| 2011/0276553 A1* | 11/2011 | Chen | G06F 16/353 |
| | | | 707/706 |
| 2012/0310874 A1 | 12/2012 | Dantressangle et al. | |
| 2013/0124466 A1* | 5/2013 | Naidu | G06F 16/27 |
| | | | 707/610 |
| 2013/0282765 A1* | 10/2013 | Bhattacharjee | G06F 16/211 |
| | | | 707/803 |
| 2015/0088924 A1* | 3/2015 | Abadi | G06F 16/90335 |
| | | | 707/769 |
| 2015/0149837 A1* | 5/2015 | Alonso | G07F 17/32 |
| | | | 714/57 |
| 2015/0156213 A1* | 6/2015 | Baker | H04L 63/1416 |
| | | | 726/23 |
| 2016/0078652 A1 | 3/2016 | Abuelsaad et al. | |
| 2016/0210270 A1* | 7/2016 | Kelly | G06Q 10/10 |
| 2016/0224618 A1* | 8/2016 | Robichaud | G06F 16/2423 |
| 2017/0116307 A1* | 4/2017 | Kapoor | G06F 16/213 |
| 2018/0096001 A1 | 4/2018 | Soza | |
| 2018/0096165 A1* | 4/2018 | Warshavsky | G06F 16/2282 |

* cited by examiner

Two different schemas

| Key | Value (JSON data object as per the model) | Key | Value (JSON data object as per the model) |
|---|---|---|---|
| key1 | Person<br>→ Name : Soma Shekar Naganna<br>→ Address : 420, Gandhi Market, Bangalore, 560027<br>→ Identifier : 560-903-761 | key2 | Person<br>→ Name:<br>  → FName : Soma, MName : Shekar, LName : Naganna<br>→ Address:<br>  → StNo: 420, StName: Gandhi Market, City: Bangalore, Zip: 560027<br>→ Identifier :<br>  → SSN: 560-903-761 |

PersonModel1 | PersonModel2

INTELLIGENT VISUALIZATION OF UNSTRUCTURED DATA IN COLUMN-ORIENTED DATA TABLES

TECHNICAL FIELD

The present invention relates to systems and methods for visualizing unstructured data in a column-oriented data table, and more specifically the embodiments of a system for a visibility engine for intelligent visualization of unstructured data in column-oriented data tables.

BACKGROUND

Column-oriented data tables such as those used in NoSQL databases are often used in distributed data processing environments to increase data processing throughput by assigning specific columns to specific servers and storage devices. Column-oriented data tables are also used for applications with unstructured or sparse data due to their flexible storage capabilities. Consequently, the processing demand for column-oriented data tables continues to increase. Column based database are aimed at analytics and are optimized for aggregations coupled with large data compression.

SUMMARY

An embodiment of the present invention relates to a method, and associated computer system and computer program product for intelligent visualization of unstructured data in a column-oriented data tables. A processor of a computing system receives unstructured data from a plurality of sources for recording into the column-oriented data table, the column-oriented data table having a database schema using a plurality of keys to visualize one or more attributes in the column-oriented data table. It is then determined that a semantically related key is used to visualize the one or more attributes contained in the unstructured data received from the plurality of sources, wherein the semantically related key is different from the plurality of keys and is not synchronized with the database schema of the column-oriented data table. The unstructured data is formatted to synchronize the unstructured data with the database schema of the column-oriented data table, wherein the formatting includes querying a mapping of synonymous keys to locate an equivalent key that is equivalent to the plurality of keys. The synchronized unstructured data is outputted into the column-oriented data table so that the unstructured data is visualized according to the database schema of the column-oriented data table as a function of replacing the semantically related key with the equivalent key.

BRIEF DESCRIPTION OF THE DRAWINGS

FIG. 1 depicts two rows of a single column-oriented data table employing two different schemas.

DETAILED DESCRIPTION

Figure 2:
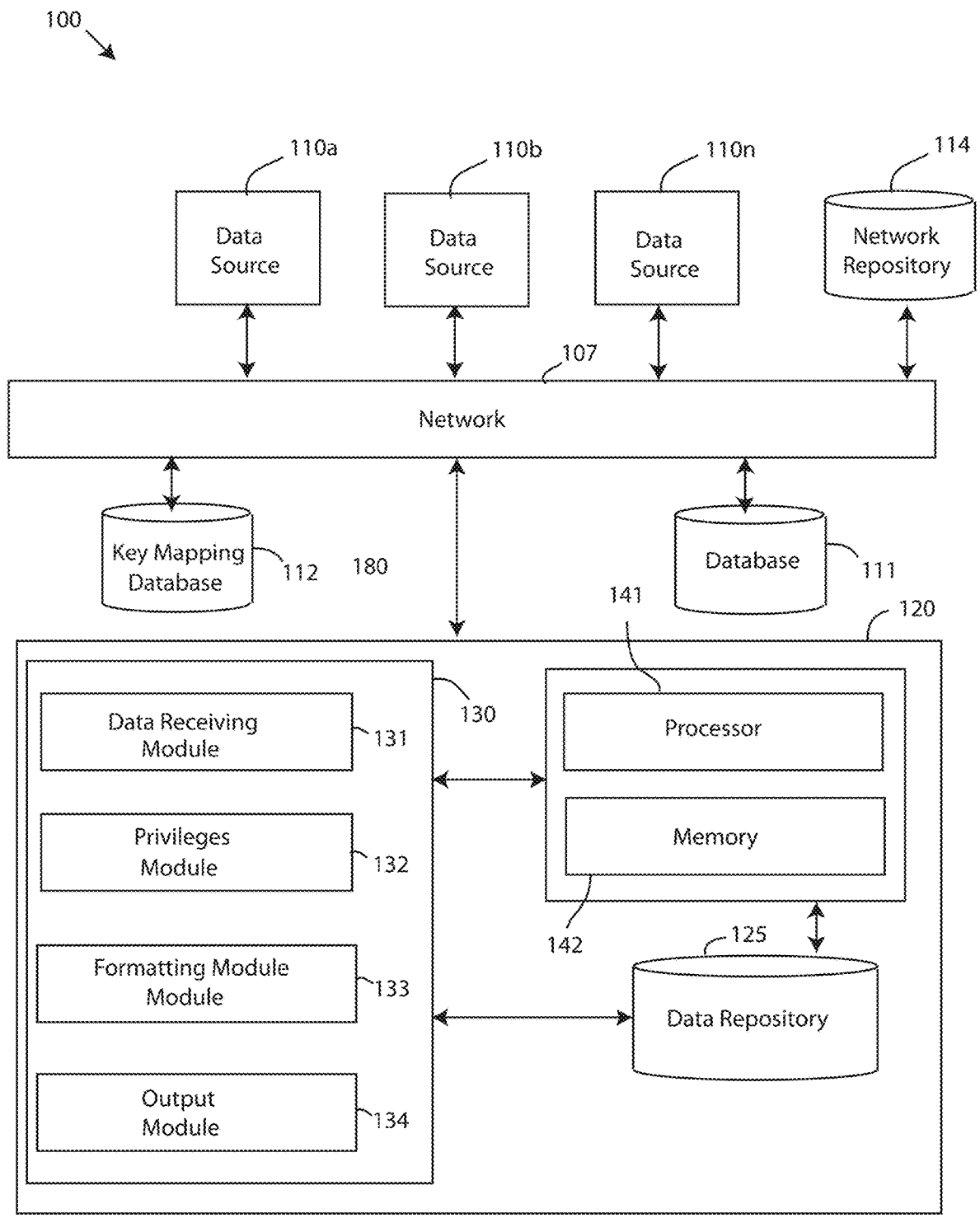
FIG. 2 depicts a block diagram of a database visibility system, in accordance with embodiments of the present invention.

Conventional column-oriented data stores like NoSQL are usually key-value based where there is no schema, but the entire data is treated like a BLOB for faster processing, and aggregation and are optimized for storing a large amount of unstructured data. There must be additional computer implemented methods for adding additional features like entity modeling, matching, entity entitlements and deployment.

In any database/store, the means to provide governance is often tricky and difficult. Users who have access to the data tables do not necessarily need to have access to every field in that data table, especially if the data in the data table(s) is accessed and shared by multiple entities or organizations. Governance and intelligent visualization is especially needed in key-value based column-oriented tables because the entire data usually exists as a chunk or BLOB and there is no specific schema available to govern. Embodiments of the present invention provide a governance to column-oriented data tables that grants visualization of data in the column-oriented data tables/stores based on organization privilege and access policies. Embodiments of the present invention create a map of all the attribute keys against each role in the system indicating the attribute key value pairs that a user can have access to. Once the rules are defined, a filter is applied to filter out data based on the user accessing the data in the column-oriented data table. Further, embodiments of the present invention allow intelligent visualization of unstructured data coming in from various sources to be recorded into the column-oriented data table. The unstructured data is displayed in the column-oriented data table according to a desired data schema of the column-oriented data table, even when the data attribute keys are not the same as the defined keys and privileges synchronized with the schema.

By way of an example, consider a column-oriented key-value based data table containing unstructured data from different sources is recorded according to conventional methods. FIG. 1 depicts two rows of a single column-oriented data table employing two different schemas. Even though the two schemas (i.e. PersonModel 1 & PersonModel 2) include identical attributes, the keys used in the schemas are semantically related but different. In particular, the keys of PersonModel 1 (i.e. "Name," "Address," and "Identifier") associated with the attributes (e.g. name, address, and identifier) of the person are different/disparate from the keys of PersonModel 2 (i.e. "FName," MName," "LName," "StNo," "StName," "City," "Zip," and "SSN"). If conventional database management software is trained/programmed to visualize the unstructured data based on the schema associated with PersonModel 1, the conventional database management software may not function properly for PersonModel 2, or may even completely ignore the unstructured data and/or attributes contained in the unstructured data coming from the source populating PersonModel 2. In existing solutions of visualization of data in data stores based on organization privilege and access policy only, there lacks an intelligence that will enable database management software to adapt to the ever-changing unstructured data that is fed into the column-oriented data-tables. Every time a new entity/model opts in to the datastore, the conventional database management software will be unable to recognize the new model/schema because of the set metadata model key map, therefore failing in its purpose. To synchronize the unstructured data for visualization in a same column-oriented data table, conventional database management software would have to perform one or many extract-load-transform (ETL) operations on the model data, which is costly, time consuming, and requires a large, additional expenditure of computer resources.

Accordingly,embodiments of the present invention include a system or associated method for providing an intelligence for visualizing unstructured data persisting in column-oriented data-tables in a system that employs a rules of visibility (ROV) engine that grants different users across multiple entity data tables, the entitlements to view the entity data as per their respective roles, and formats the unstructured data to synchronize with the schema of the column-oriented data table despite the use of different attribute keys.

FIG. 2 depicts a block diagram of a database visibility system 100, in accordance with embodiments of the present invention. The database visibility system 100 is a computing system for intelligent visualization of unstructured data in column-oriented data tables. The database visibility system 100 may be useful for providing an intelligence that enables database management software to adapt to data models or schemas having semantically related but different attribute keys without having to perform any ETL operations. Embodiments of the database visibility system 100 may be a database management system, a visibility engine software, a data schema synchronization system, and the like. In an exemplary embodiment, the database visibility system 100 includes a computing system 120. The computing system 120 may be a computer system, a computer, a server, one or more servers, a backend computing system, and the like, for controlling the storage, compression, recording, visualization, retrieval, and updating of data objects stored on database 111. In an exemplary embodiment, the computing system 120 is a database management system.

Furthermore, the database visibility system 100 includes one or more data sources 110a, 110b . . . 110n (a single data source is referred to hereinafter as data source 110), one or more database 111 (a single database is referred to hereinafter as database 111), and a key mapping database 112 that are communicatively coupled to the computing system 120 over a network 107. For instance, information/data may be transmitted to and/or received from the data source 110, database 111, and key mapping database 112 over a network 107. In one embodiment, the network 107 is the cloud. Further embodiments of network 107 may refer to a group of two or more computer systems linked together. Network 107 may be any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In another embodiment, the architecture of the network 107 is a peer-to-peer network, wherein in another embodiment, the network 107 may be organized as a client/server architecture.

In one example, the network 107 further comprises, in addition to the computing system 120, a connection to one or more network-accessible knowledge bases 114, which are network repositories containing information of the sender/recipient, product information, catalogs, location information, user activity, user preferences, network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging call requests, bit lengths, data object locations, addresses, and the like, to generate both historical and predictive reports regarding a function of the data database visibility system 100. In one embodiment, a data collection center housing the network-accessible knowledge bases 114 includes an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

The data source 110 is any source or system integrated or otherwise in communication with the database 111 that feeds unstructured data to the computing system 120. The unstructured data can be text or other data files. Examples of a data source can be IBM DB2 DBMS accessed through a gateway, an ORACLE DBMS running OS/2 operating system, a software program loaded on a user computer, a server, or any computing device capable of transmitting a file or live data feed.

Referring still to FIG. 2, the database visibility system 100 also includes one or more databases 111. The database 111 is storage device configured to store data objects, data, compressed data objects and dictionaries associated with the data objects, and the like. The database 111 can be accessed by the computing system 120 over a network for retrieving data objects and an accompanying dictionary. The data objects stored by the database 111 are represented by tables, such as a key-based column-oriented data table, or partitions of tables compressed by a compression algorithm. In an exemplary embodiment, the data objects stored on the database 111 are compressed using variable length compression, such as entropy encoding or Huffman compression. Each data object that is compressed and stored on the database includes a dictionary for translating a specific length code to a specific set of symbols, which can be used to expand the compressed data object. Further, the database visibility system 100 also includes a key mapping database 112. The key mapping database 112 is storage device configured to store a mapping of keys used to identify attributes of a data table. The key mapping database 112 can be accessed by the computing system 120 over a network for retrieving data objects and an accompanying dictionary for locating equivalent keys, as described in greater detail infra.

Furthermore, the computing system 120 of the database visibility system 100 is equipped with a memory device 142 which stores various data/information/code, and a processor 141 for implementing the tasks associated with the database visibility system 100. A database visualization application 130 is loaded in the memory device 142 of the computing system 120. The database visualization application 130 can be an interface, an application, a program, a module, or a combination of modules. In an exemplary embodiment, the database visualization application 130 may be a software application running on one or more back end servers servicing a database management system.

The database visualization application 130 of the computing system 120 includes a data receiving module 131, a privileges module 132, a formatting module 133, and an output module 134. A "module" may refer to a hardware-based module, software-based module or a module may be a combination of hardware and software. The hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

The data receiving module 131 includes one or more components of hardware and/or software program code for receiving unstructured data from a plurality of sources for recording into the column-oriented data table. The unstructured data is received by a plurality of data sources 110 that are integrated or in communication with the database 111. The column-oriented data table of database 111 has a database schema using a plurality of keys to visualize one or more attributes in the column-oriented data table. A key as used herein is a data item or identifier that exclusively identifies an attribute recorded in a data table. An attribute as used herein is a database field in a data table. From the example in FIG. 1, the keys of the first schema are "Name," "Address," and "Identifier" that identify the database field of a name, address, and identifier of a person, and the keys of the second, different schema are "FName," "MName," "LName," "StNo," "StName," "City," "Zip," and "SSN" that identify the same attributes of a name, address, and identifier of a person. The column-oriented data table of database 111 displays data in rows and columns and is populated according to a database schema that has a set list of keys identifying attributes. The set list of keys associated with the database schema can be stored in the key mapping database 112.

Data sources 110 feed unstructured data to the computing system 120 for recording into the database 111, which can be added into one or more data tables, such as a column-oriented data table. Receiving the unstructured data from a data source 110 triggers an add operation that first checks privileges for reading and writing to the database 111, and then determines whether a record being added to the data table is in sync with the database schema of the database 111. For example, the computing system 120 includes a privileges module 132 that includes one or more components of hardware and/or software program code for checking an organization privilege against each source to verify that the source is entitled to: i) write attributes of the unstructured data to the column-oriented data table, ii) write a subset of attributes of the unstructured data to the column-oriented data table, and iii) read the attributes and the subset of attributes from the column-oriented data table.

Figure 3:
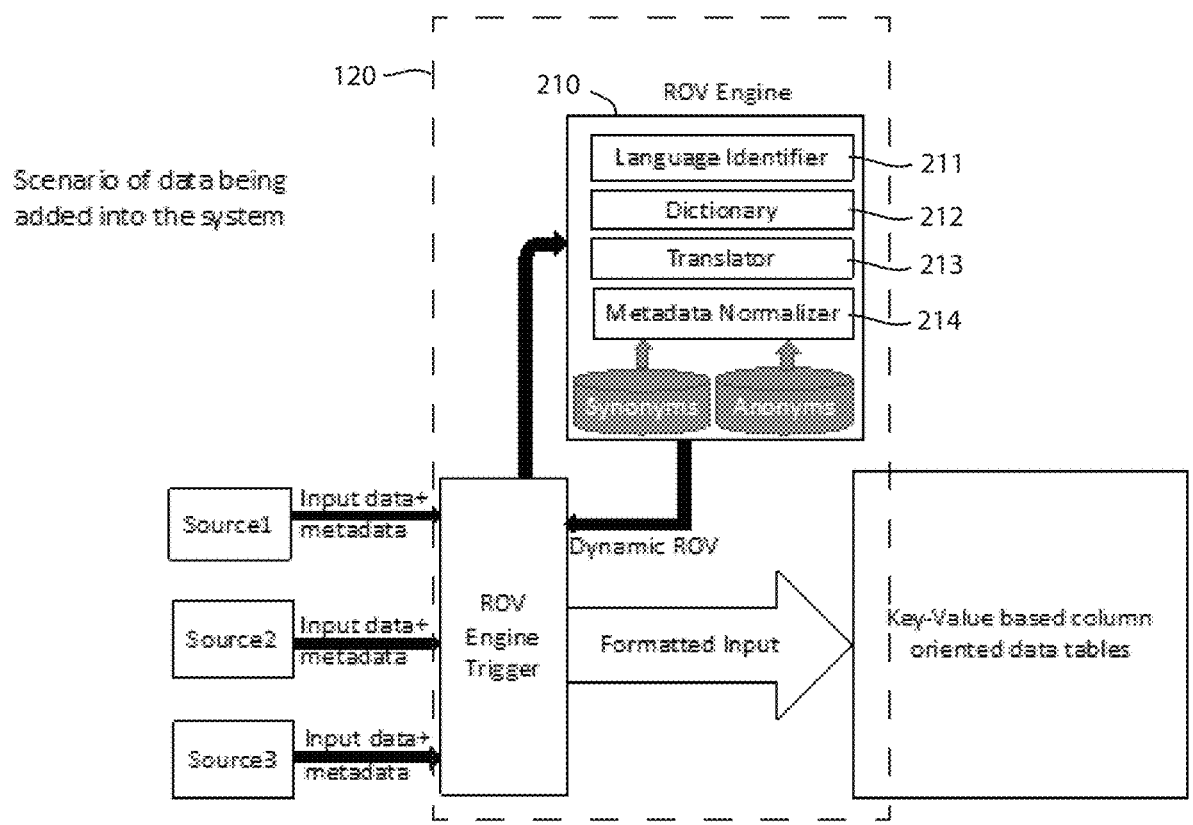
FIG. 3 depicts a schematic view of an add operation using a visibility engine, in accordance with embodiments of the present invention.

FIG. 3 depicts a schematic view of an add operation using a visibility engine, in accordance with embodiments of the present invention. As shown, the computing system 120 includes a visibility engine 210, which comprises a language identifier 211, a dictionary 212, a translator 213, and a metadata normalizer 214. The visibility engine 210 is controlled by the database visibility application 130, and the modules thereof. The add operation triggers the privileges module 132 to utilize the visibility engine 210 to check organization privileges against Source1, Source2, and Source3 to check if Source1, Source2, and Source3 are entitled to add the data to the data table. If the data schema is the same as that being deployed in the visibility engine 210 and the data source in question is properly entitled to read/write to the data table, then the unstructured data record is added into the data table without modification. For example, the privileges module 132 verifies that Source1, Source2, and Source3, respectively, are entitled to make changes to data tables of the database 111, and determines that the schema is in sync with the schema of the data table; the keys used to identify attributes are the same as the set list of predefined keys. If the privileges module 132 determines that Source1, Source2, or Source3 do not have the required entitlement or privilege to add a record, then the visibility engine 210 ignores the record and will not allow the add operation to process. In some instances, the privileges module 132 determines that the source is entitled to perform read/write functions to the database, but the record being added by Source1. Source2, or Source3 is not is sync with the schema. For example, in response to receiving the unstructured data from data sources 110, the privileges module 132 determines that a semantically related but different key is used to visualize one or more attributes contained in the unstructured data received from Source1, Source2, or Source3. The semantically related key is different from the plurality of keys and is also not synchronized with the database schema of the column-oriented data table.

By way of example, Source1, Source2, or Source3 each feed unstructured data relating to the attribute of a "name of person,"herein the schema for the column-oriented data table has a set key of "Name" for visualizing the attribute "name of person" in a column of the column-oriented data table. Source 1 uses "Name" as a key for the attribute of "name of person" and is entitled to read/write to the database 111. Source 2 uses "First Name" and "Last Name" as a key for the attribute of "name of person" and is entitled to read/write to the database 111. Source 3 uses "Fname/LName" as a key for the attribute "name of person," but Source3 does not have the requisite privilege to access or write to the database 111. The data coming from Source3 is automatically filtered out due to a lack of privileges to perform an add operation to the column-oriented data table, and the add operation is not processed. The add operation to add data from Source1 is processed without modification because Source1 includes the requisite privilege to write to the column-oriented data table and the key used is synchronized with the schema of the column-oriented data table. The add operation for Source2 is processed but requires modification to synchronize the schemas because although Source2 is entitled to write to the column-oriented data table, the key used "First Name" and "Last Name" is semantically related but different from "Name" as it relates to being used as an exclusive identifier for "name of person."

Without modifications, the column-oriented data table may fail to visualize the data entry from Source2.

The computing system 120 also includes a formatting module 133. The formatting module 132 includes one or more components of hardware and/or software program code for formatting the unstructured data to synchronize the unstructured data with the database schema of the column-oriented data table. For instance, the formatting module 133 performs one or more operations to align the schemas by the data sources 110 feeding into the computing system 120 with the schema of the one or more column-oriented data tables of database 111. The one or more operations performed to synchronize the schemas include identifying a language of the unstructured data, translating the text of the unstructured data, including keys, into a desired language, if necessary, aggregating attribute fields associated with attributes contained in the unstructured data into a single attribute field, querying a mapping of synonymous keys to locate equivalent key that is equivalent to the plurality of keys, and a performing a probabilistic match between semantically related keys and the set list of keys synchronized with the schema.

According to exemplary embodiments of the invention, the metadata of the unstructured data received from the data source 110 is analyzed to determine the semantically related key. Analyzing the metadata of the unstructured data detects a plurality of parameters, including a language, a topography, a location of the source, etc.

The formatting module 133 determines if language translation is advantageous to determine an edit distance between keys, and if it is found to be advantageous, the formatting module 133 uses the visibility engine 210 to translate the keys to a set system locale using conventional approaches. In an exemplary embodiment, the language identifier 211 of the visibility engine 210 identifies the language of the unstructured data by analyzing the metadata. For example, the language identifier 211 identifies that the language of the unstructured data is in German, and the desired language of the column-oriented data table is English. The translator 213 of the visibility engine 210 translates the German language data to English.

If the data is compressed, the dictionary 212 of the visibility engine 210 is used for expansion of the data if needed. For example, the dictionary 212 translates common character strings into a shorter code, such as a fixed length code (e.g. 12-bit code in a 4K sized dictionary). For example, the fixed length code is compared with the dictionary 212 to determine that a specific fixed length code represents a specific set of symbols, which can be used to expand that value.

Optionally, the formatting module 132 aggregates attribute fields associated with attributes contained in the unstructured data into a single attribute field. In an exemplary embodiment, an aggregator (not shown) of the visibility engine 210 aggregates various fields into one if required. For example, if the schema is programmed to view only an address field and the incoming data has multiple fields like city, street, country etc., then the aggregator can aggregate all the fields into one address field.

Moreover, the formatting module 133 queries a mapping of synonymous keys to locate an equivalent key that is equivalent to the plurality of keys. The mapping of the keys can be stored in the key mapping database 112. In an exemplary embodiment, the metadata normalizer 214 of the visibility engine 210 checks/queries the attribute key mapping stored in the key mapping database 112. The key mapping is created using mapping techniques to map closely associated or synonymous keys with the set keys associated with the schema of the column-oriented data table. If the metadata normalizer 214 is successful in finding an equivalent attribute key, the rules of visibility of that key can be applied to the incoming key as well. The metadata normalizer 214 incorporates a probabilistic matching engine to query the shared attribute key mapping database 112 in search of an equivalent key that is equivalent to the semantically related key and also matches the set list of keys associated the schema of the column-oriented data table. The metadata normalizer 214 may use various known approaches like edit distance matching, phonetic matching, equivalence matching for fetching the appropriate semantically related attribute keys in the attribute key mapping from the key mapping database 112. Further, the formatting module 133, as a part of the locating an equivalent key, can use a probabilistic matching engine to perform a probabilistic match between the semantically related key and the plurality of keys synchronized with the database schema of the column-oriented data table to increase an accuracy and reduce a processing time to locate the equivalent key.

In the output key mapping (e.g. locating an equivalent key from the key mapping database 112), although the semantically related keys and the equivalent key located from the mapping database 112 are conceptually aligned, the keys may convey totally different meanings depending on the context. For values in the output mapping entry that are too dissimilar, for each entry in the output mapping, a sequence alignment can be performed of the organization values corresponding to the semantically related key. For organization values with an edit distance that is too far (i.e., the semantically related key and the equivalent key found from the mapping are too dissimilar based on a fuzzy match), the record value can be flagged as a "low trust value." For conflicting values, a heuristic based approach can be applied to evaluate a known set of criteria, which resolves conflicts across data values by assigning a ranking to denote the quality of values. Values that are identified as low quality are flagged as "low trust value".

Moreover, insights can be derived from assigned values of the attributes present in the data record create keys mapping by performing similarity measurements of the values across each data record, eliminating low variability values (e.g. Boolean). For a subset of values that have an edit distance that is below a prescribed threshold (i.e. keys have "high" similarity which serves to conceptually cluster the corresponding keys), a new shared key corresponding to this subset can be created.

Optionally, each remaining key in the data set that does not correspond to a shared key in the output mapping at this point has not met the criteria for direct match or fuzzy match comparison (e.g. no equivalent key is initially found). Therefore, for remaining keys, brute force comparison, can be performed using a human-in-the-middle approach to compare the remaining keys across the sets, and manually add entries to the output key mapping based on this comparison.

The computing system 120 also includes an output module 134. The output module 134 includes one or more components of hardware and/or software program code for outputting the synchronized unstructured data into the column-oriented data table so that the unstructured data is visualized according to the database schema of the column-oriented data table as a function of replacing the semantically related key with the equivalent key. As a result, intelligent visualization of unstructured data coming in from various sources into a column-oriented data table is achieved.

Figure 4:
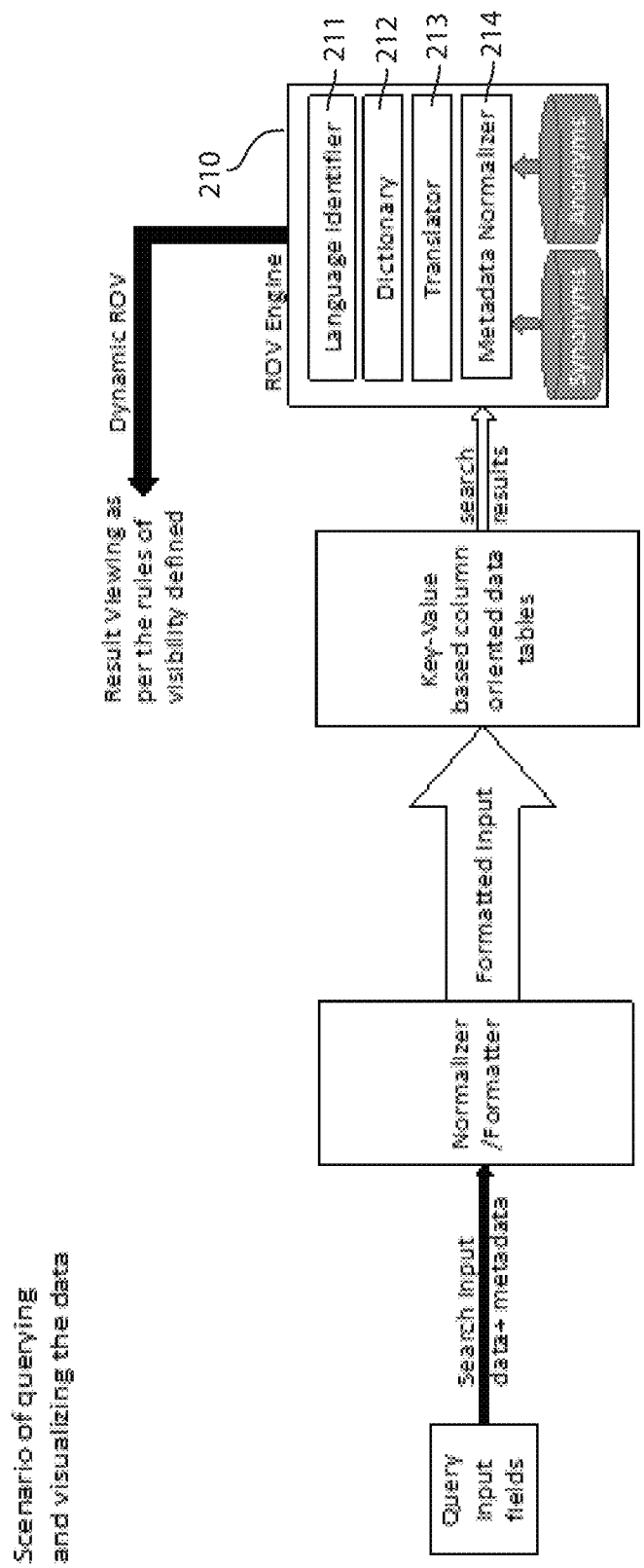
FIG. 4 depicts a schematic view of a visualization operation using the visibility engine, in accordance with embodiments of the present invention.

FIG. 4 depicts a schematic view of a visualization operation using the visibility engine, in accordance with embodiments of the present invention. Whenever any query is made from a source using some attribute keys, the metadata is sent along with the actual query input. The results are fetched from the database 111 depending upon the query fields, and access controls are applied to the search results as to what is to be shown as per the access control of the user. However, the keys associated with the schema of the data table might not match the keys present in the search result data. Therefore, the visualization application 130 resolves the inconsistency as well as checking for privileges so that the search results are accurately shown to the user. Further, when the results are to be shown to the user on a UI, language and demography is detected and the corresponding metadata is passed to backend which applies this information to the search results and then the results are shown according to the source's preference.

Various tasks and specific functions of the modules of the computing system 120 may be performed by additional modules, or may be combined into other module(s) reduce the number of modules. Further, embodiments of the computer or computer system 120 may comprise specialized, non-generic hardware and circuitry (i.e., specialized discrete non-generic analog digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Moreover, embodiments of the database visibility system 100 improve database technology by synchronizing schemas used in data tables with the schemas used by the data sources feeding the unstructured data to the database. The appearance of the column-oriented data table is thus optimized for viewing and ensures that data in a search result is not omitted due to an inability for the software to detect or visualize a particular attribute. Embodiments of the database visibility system 100 provide a technical solution to the above-drawbacks by eliminating the computationally intensive need to perform ETL operations in the event different keys are used for related attributes contained in the unstructured data for recording into a column-oriented data table. The technical solution(s) described herein is necessarily rooted in computer technology in order to overcome a problem specifically arising in the database technology and data visualization and governance technology.

Figure 5:
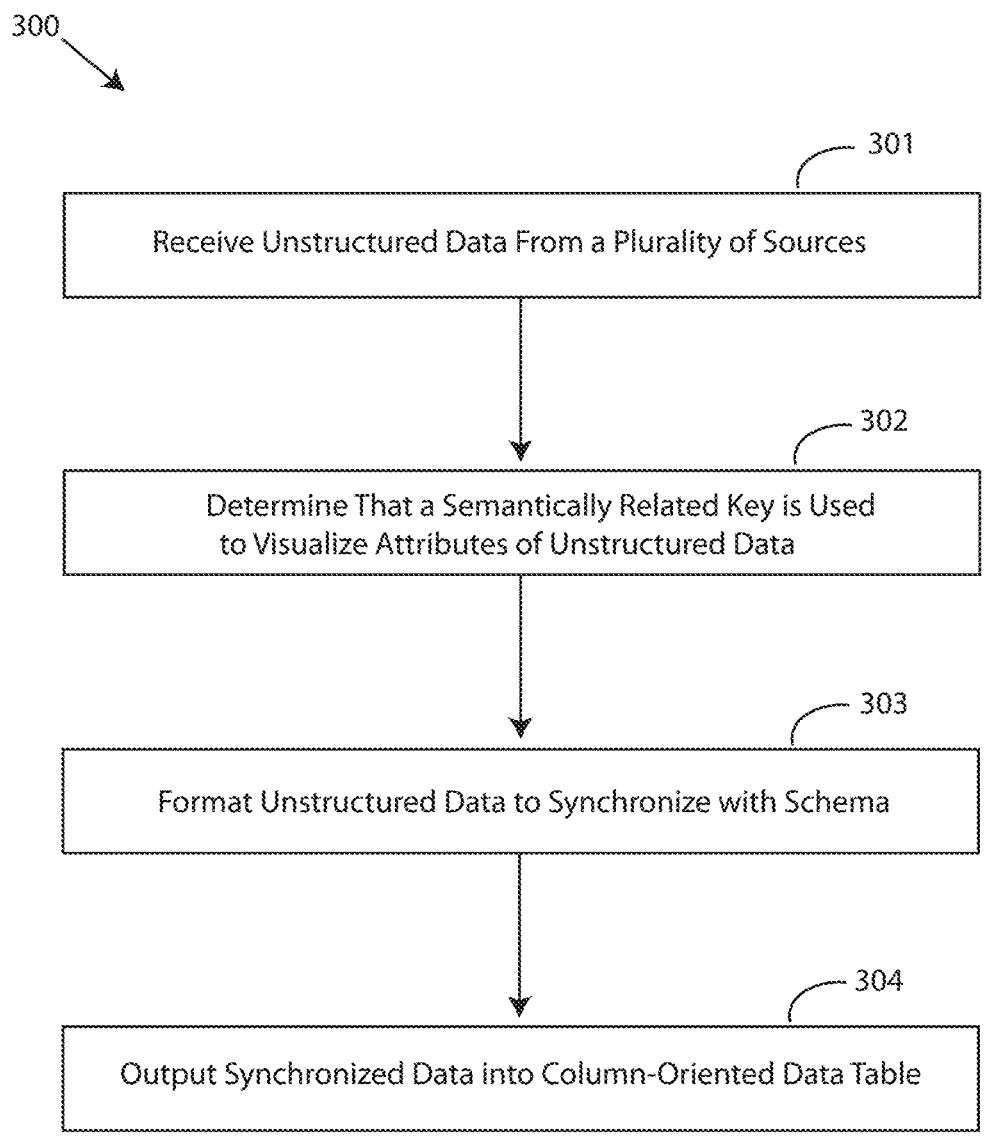
FIG. 5 depicts a flow chart of a method for intelligent visualization of unstructured data in a column-oriented data table, in accordance with embodiments of the present invention.

FIG. 5 depicts a flow chart of a method for intelligent visualization of unstructured data in a column-oriented data table, in accordance with embodiments of the present invention. One embodiment of a method 300 or algorithm that may be implemented for intelligent visualization of unstructured data in a column-oriented data table with the database visibility system 100 described in FIGS. 1-4 using one or more computer systems as defined generically in FIG. 7 below, and more specifically by the specific embodiments of FIG. 1.

Embodiments of the method 300 for intelligent visualization of unstructured data in a column-oriented data table, in accordance with embodiments of the present invention, may begin at step 301 wherein unstructured data is received from a plurality of data sources. Step 302 determines that a semantically related key is used to visualize attributes of unstructured data. Step 303 formats the unstructured data to synchronize with the schema associated with the column-oriented data table. Step 304 outputs synchronized data into the column-oriented data table.

Figure 6:
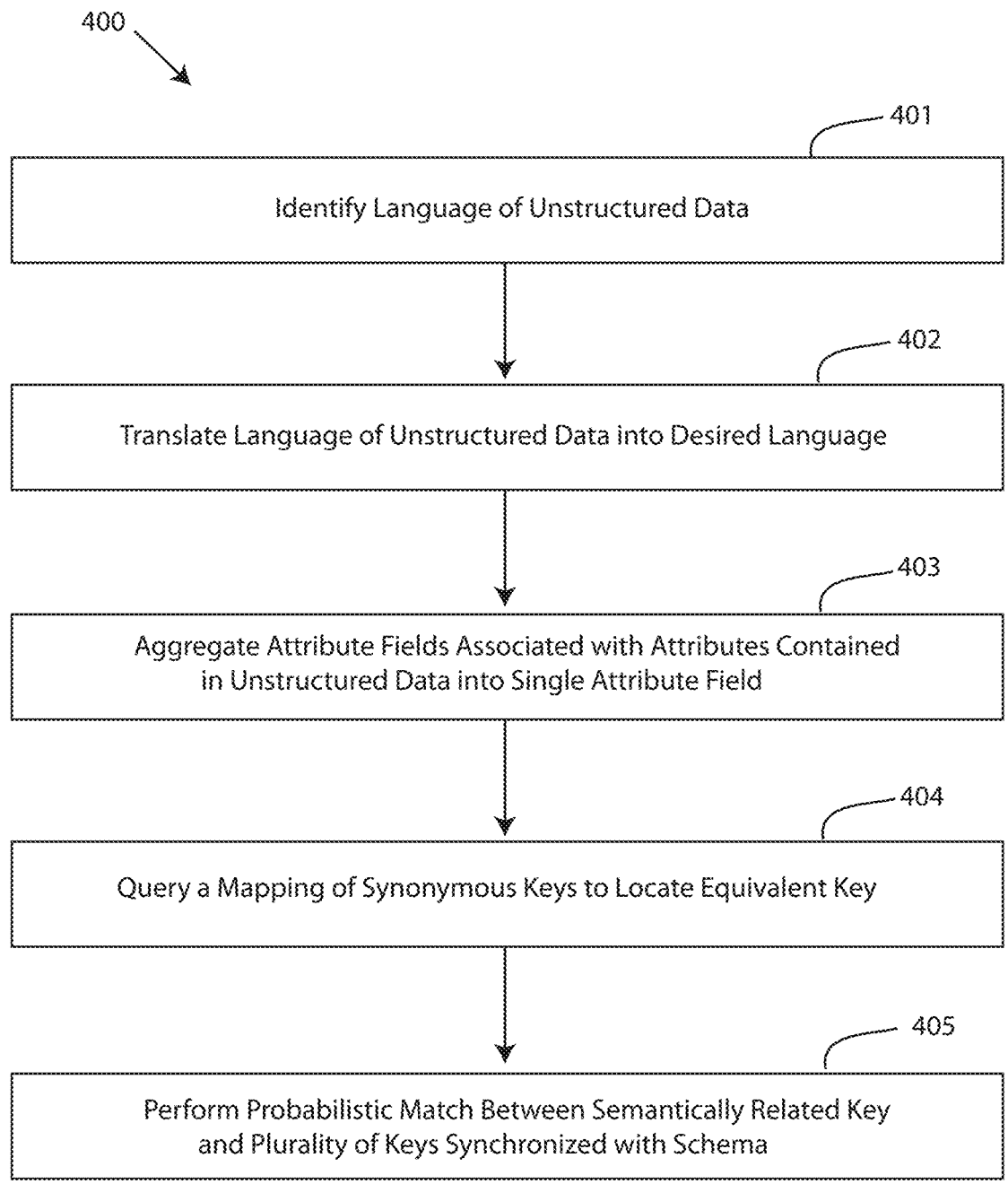
FIG. 6 depicts a detailed flow chart of a step of the method of FIG. 5 for intelligent visualization of unstructured data in a column-oriented data table, in accordance with embodiments of the present invention.

FIG. 6 depicts a detailed flow chart of a step 303 of the method of FIG. 5 for intelligent visualization of unstructured data in a column-oriented data table, in accordance with embodiments of the present invention. Step 401 identifies a language of the unstructured data. Step 402 translates the language (if needed) of the unstructured data into a desired language. Step 403 aggregates attribute fields associated with the attributes contained in the unstructured data into a single attribute field. Step 404 queries a mapping of synonymous keys to locate a key that is equivalent to the semantically related key and the predefined set key. Step 405 performs a probabilistic match between the semantically related key and the set keys synchronized with the schema.

Figure 7:
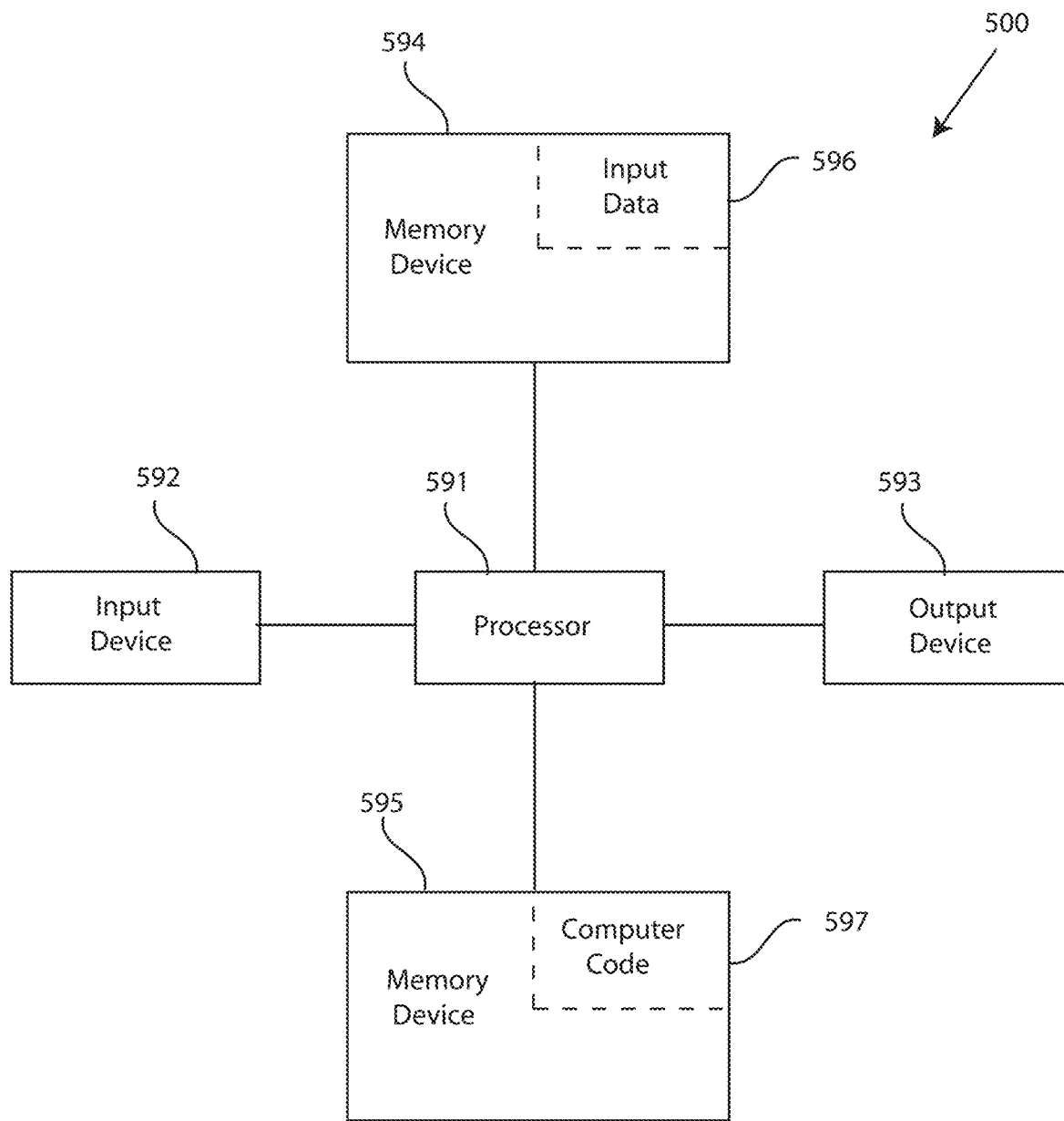
FIG. 7 depicts a block diagram of a computer system for the database visibility system of FIGS. 1-4, capable of implementing methods for intelligent visualization of unstructured data in a column-oriented data table of FIGS. 5-6, in accordance with embodiments of the present invention.

FIG. 7 depicts a block diagram of a computer system for the database visibility system of FIGS. 1-4, capable of implementing methods for intelligent visualization of unstructured data in a column-oriented data table of FIGS. 5-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for intelligent visualization of unstructured data in a column-oriented data table in the manner prescribed by the embodiments of FIGS. 5-6 using the data visibility system 100 of FIGS. 1-4, wherein the instructions of the computer code 597 may be executed by processor 591 via memory device 595. The computer code 597 may include software or program instructions that may implement one or more algorithms for implementing the method for intelligent visualization of unstructured data in a column-oriented data table, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to database systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to intelligently visualize unstructured data in a column-oriented data table. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for intelligent visualization of unstructured data in a column-oriented data table. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for intelligent visualization of unstructured data in a column-oriented data table.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
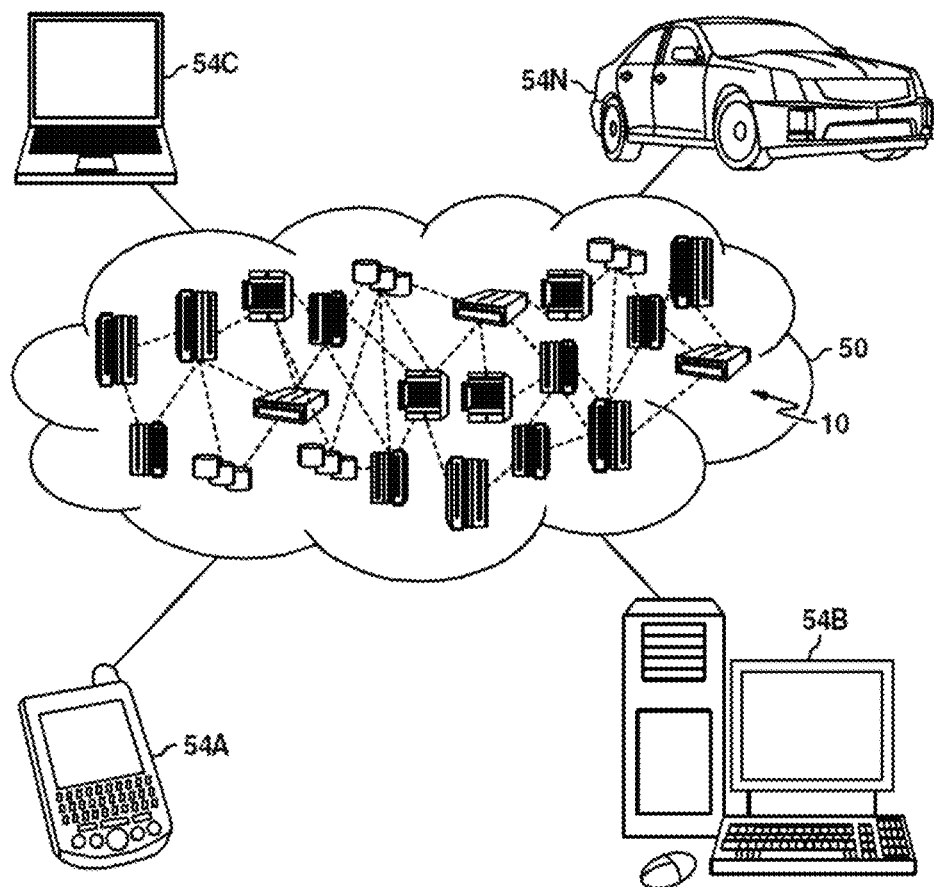
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
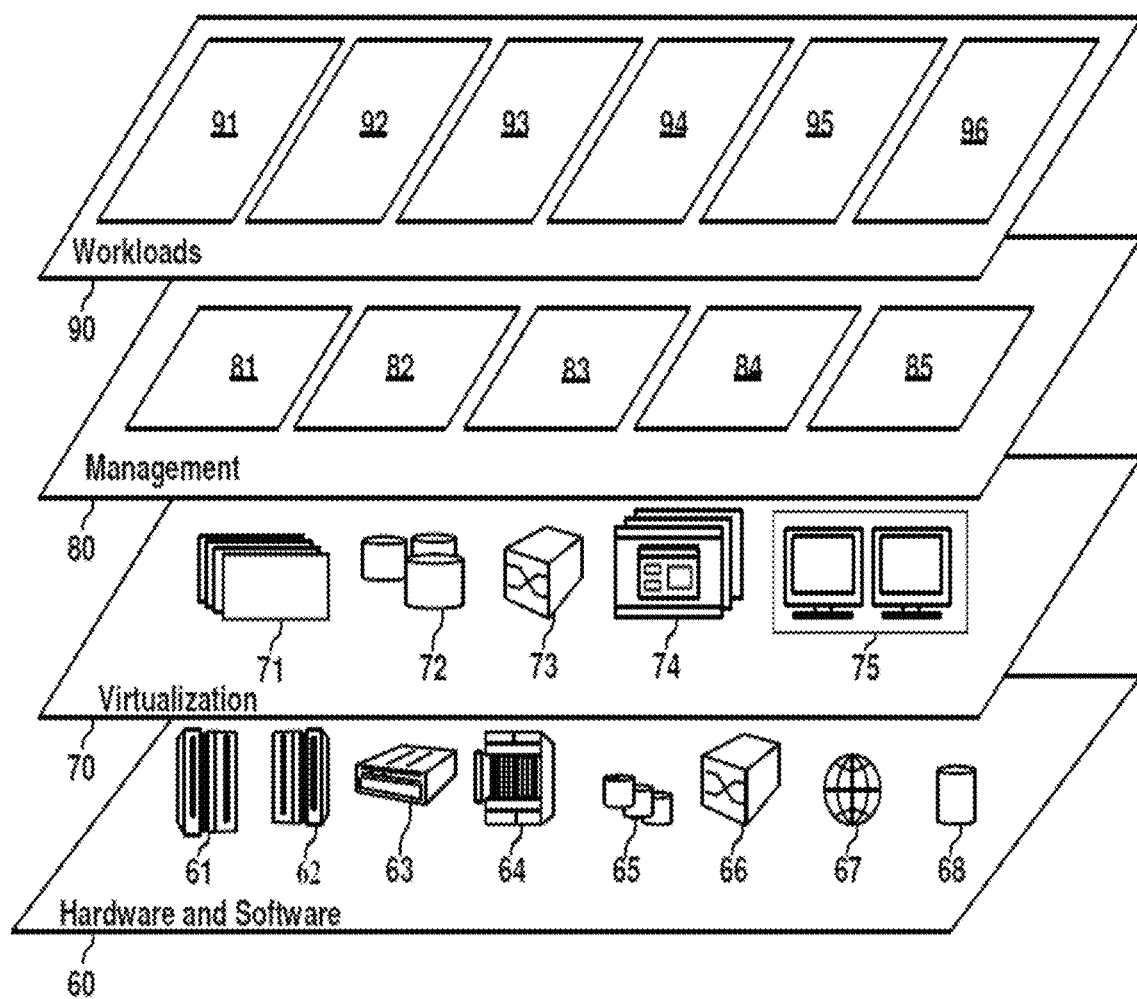
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and data table visualization 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for intelligent visualization of unstructured data in a column-oriented data table, the method comprising:

receiving, by a processor of a database management system, unstructured data from a plurality of sources for recording into the column-oriented data table, the column-oriented data table having a database schema using a plurality of keys to visualize one or more attributes in the column-oriented data table:
  determining, by the processor, that a semantically related key is used to visualize the one or more attributes contained in the unstructured data received from the plurality of sources, wherein the semantically related key is different from the plurality of keys and is not synchronized with the database schema of the column-oriented data table;
  formatting, by the processor, the unstructured data to synchronize the unstructured data with the database schema of the column-oriented data table, wherein the formatting includes querying a mapping of synonymous keys to locate an equivalent key that is equivalent to the plurality of keys; and
  outputting, by the processor, the synchronized unstructured data into the column-oriented data table so that the unstructured data is visualized according to the database schema of the column-oriented data table as a function of replacing the semantically related key with the equivalent key.

2. The method of claim 1, further comprising checking, by the processor, an organization privilege against each source to verify that the source is entitled to: i) write attributes of the unstructured data to the column-oriented data table, ii) write a subset of attributes of the unstructured data to the column-oriented data table, and iii) read the attributes and the subset of attributes from the column-oriented data table.

3. The method of claim 1, wherein querying the mapping of synonymous keys includes using a probabilistic matching engine to perform a probabilistic match between the semantically related key and the plurality of keys synchronized with the database schema of the column-oriented data table.

4. The method of claim 1, wherein the formatting further includes:
  identifying, by the processor, a language of the unstructured data; and
  translating, by the processor, the language of the unstructured data into a desired language of the column-oriented data table.

5. The method of claim 1, wherein, as a result of the modifying, the unstructured data is visualized in the column-oriented data table without performing an Extract-Transform-Load (ETL) operation on the unstructured data.

6. The method of claim 1, wherein the formatting further includes aggregating, by the processor, attribute fields associated with the one or more attributes contained in the unstructured data into a single attribute field.

7. The method of claim 1, wherein the semantically related key is determined by analyzing the metadata of the unstructured data to detect a plurality of parameters, including a language, a topography, and a location of the source.

8. A database management system, comprising:
  a processor;
  a memory device coupled to the processor; and
  a computer readable storage device coupled to the processor, wherein the storage device contains program code executable by the processor via the memory device to implement a method for intelligent visualization of unstructured data in a column-oriented data table, the method comprising:
    receiving, by a processor of a database management system, unstructured data from a plurality of sources for recording into the column-oriented data table, the column-oriented data table having a database schema using a plurality of keys to visualize one or more attributes in the column-oriented data table;
    determining, by the processor, that a semantically related key is used to visualize the one or more attributes contained in the unstructured data received from the plurality of sources, wherein the semantically related key is different from the plurality of keys and is not synchronized with the database schema of the column-oriented data table;
    formatting, by the processor, the unstructured data to synchronize the unstructured data with the database schema of the column-oriented data table, wherein the formatting includes querying a mapping of synonymous keys to locate an equivalent key that is equivalent to the plurality of keys; and
    outputting, by the processor, the synchronized unstructured data into the column-oriented data table so that the unstructured data is visualized according to the database schema of the column-oriented data table as a function of replacing the semantically related key with the equivalent key.

9. The database management system of claim 8, further comprising checking, by the processor, an organization privilege against each source to verify that the source is entitled to: i) write attributes of the unstructured data to the column-oriented data table, ii) write a subset of attributes of the unstructured data to the column-oriented data table, and iii) read the attributes and the subset of attributes from the column-oriented data table.

10. The database management system of claim 8, wherein querying the mapping of synonymous keys includes using a probabilistic matching engine to perform a probabilistic match between the semantically related key and the plurality of keys synchronized with the database schema of the column-oriented data table.

11. The database management system of claim 8, wherein the formatting further includes:
  identifying, by the processor, a language of the unstructured data; and
  translating, by the processor, the language of the unstructured data into a desired language of the column-oriented data table.

12. The database management system of claim 8, wherein, as a result of the modifying, the unstructured data is visualized in the column-oriented data table without performing an Extract-Transform-Load (ETL) operation on the unstructured data.

13. The database management system of claim 8, wherein the formatting further includes aggregating, by the processor, attribute fields associated with the one or more attributes contained in the unstructured data into a single attribute field.

14. The database management system of claim 8, wherein the semantically related key is determined by analyzing the metadata of the unstructured data to detect a plurality of parameters, including a language, a topography, and a location of the source.

15. A computer program product, comprising a computer readable hardware storage device storing a computer readable program code, the computer readable program code comprising an algorithm that when executed by a processor of a database management system implements a method for intelligent visualization of unstructured data in a column-oriented data table, the method comprising:
  receiving, by a processor of a database management system, unstructured data from a plurality of sources for recording into the column-oriented data table, the column-oriented data table having a database schema using a plurality of keys to visualize one or more attributes in the column-oriented data table;
determining, by the processor, that a semantically related key is used to visualize the one or more attributes contained in the unstructured data received from the plurality of sources, wherein the semantically related key is different from the plurality of keys and is not synchronized with the database schema of the column-oriented data table;
formatting, by the processor, the unstructured data to synchronize the unstructured data with the database schema of the column-oriented data table, wherein the formatting includes querying a mapping of synonymous keys to locate an equivalent key that is equivalent to the plurality of keys; and
outputting, by the processor, the synchronized unstructured data into the column-oriented data table so that the unstructured data is visualized according to the database schema of the column-oriented data table as a function of replacing the semantically related key with the equivalent key.

16. The computer program product of claim 15, further comprising checking, by the processor, an organization privilege against each source to verify that the source is entitled to: i) write attributes of the unstructured data to the column-oriented data table, ii) write a subset of attributes of the unstructured data to the column-oriented data table, and iii) read the attributes and the subset of attributes from the column-oriented data table.

17. The computer program product of claim 15, wherein querying the mapping of synonymous keys includes using a probabilistic matching engine to perform a probabilistic match between the semantically related key and the plurality of keys synchronized with the database schema of the column-oriented data table.

18. The computer program product of claim 15, wherein the formatting further includes:
identifying, by the processor, a language of the unstructured data; and
translating, by the processor, the language of the unstructured data into a desired language of the column-oriented data table.

19. The computer program product of claim 15, wherein, as a result of the modifying, the unstructured data is visualized in the column-oriented data table without performing an Extract-Transform-Load (ETL) operation on the unstructured data.

20. The computer program product of claim 15, wherein the formatting further includes aggregating, by the processor, attribute fields associated with the one or more attributes contained in the unstructured data into a single attribute field.

* * * * *